US009520698B2

(12) United States Patent
Pare et al.

(10) Patent No.: US 9,520,698 B2
(45) Date of Patent: Dec. 13, 2016

(54) OUTDOOR ENCLOSURE FOR POWER DISTRIBUTION EQUIPMENT

(71) Applicant: ABB Technology AG, Zurich (CH)

(72) Inventors: Denis Pare, Dorval (CA); Martin Stefanka, Longwood, FL (US)

(73) Assignee: ABB SCHWEIZ AG, Baden (CH)

( * ) Notice: Subject to any disclaimer, the term of this patent is extended or adjusted under 35 U.S.C. 154(b) by 12 days.

(21) Appl. No.: 14/618,009

(22) Filed: Feb. 10, 2015

(65) Prior Publication Data

US 2016/0233651 A1    Aug. 11, 2016

(51) Int. Cl.
*H02B 1/28*    (2006.01)

(52) U.S. Cl.
CPC ...................... *H02B 1/28* (2013.01)

(58) Field of Classification Search
CPC .............. H02B 1/26; H02B 1/28; H02B 1/30; H01B 17/42
See application file for complete search history.

(56) References Cited

U.S. PATENT DOCUMENTS

| 5,710,402 | A  | * | 1/1998 | Karnbach | H02B 13/025 218/157 |
| 5,767,440 | A  | * | 6/1998 | Byron | H02B 13/025 174/17 VA |
| 6,407,331 | B1 | * | 6/2002 | Smith | H02B 13/025 174/17 VA |
| 6,417,443 | B1 | * | 7/2002 | Smith | H02B 1/565 174/17 VA |
| 8,733,855 | B2 | * | 5/2014 | Josten | H02B 13/025 174/50 |
| 8,785,770 | B2 | * | 7/2014 | Gingrich | H02B 1/565 174/17 VA |
| 9,144,161 | B2 | * | 9/2015 | Kozuru | H05K 5/0213 |
| 9,312,668 | B2 | * | 4/2016 | Faber | H01H 9/22 |

* cited by examiner

*Primary Examiner* — William H Mayo, III
*Assistant Examiner* — Hiram E Gonzalez
(74) *Attorney, Agent, or Firm* — Taft Stettinius & Hollister LLP

(57) ABSTRACT

An outdoor enclosure for housing power distribution equipment is disclosed herein. The outdoor enclosure includes improved means for evacuating arc flash gases from inside the enclosure to the atmosphere, comprising an expansion chamber and improved chimney. The chimney includes a chimney base and chimney capping structure arrangement designed to allow for the safe ventilation of arc fault gases to the atmosphere, while maintaining weather-proof characteristics.

12 Claims, 5 Drawing Sheets

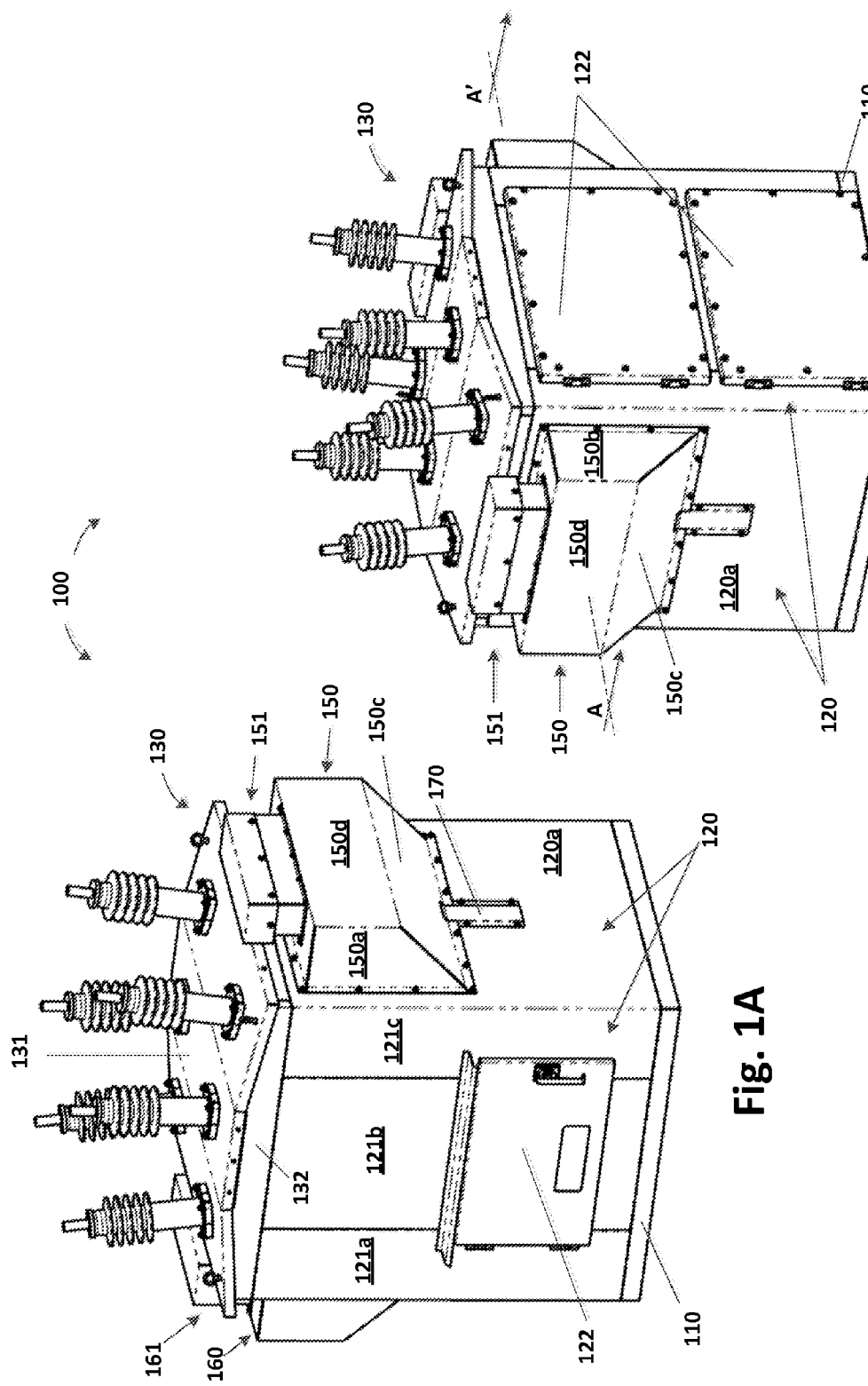

OUTDOOR ENCLOSURE FOR POWER DISTRIBUTION EQUIPMENT

FIELD OF INVENTION

The present application is directed to an improved outdoor enclosure for power distribution equipment that allows for the safe ventilation of arc fault gases to the atmosphere, while maintaining weather-proof characteristics.

BACKGROUND

Indoor power distribution equipment such as medium voltage circuit breakers, switches, dry-type distribution and small power transformers, and the like, are known in the art. When the equipment is intended for placement outdoors, it is common to house such equipment in specialized metal enclosures for the purposes of protecting the equipment from environmental conditions—e.g., from rain and snow. Arc flash events can occur in such power equipment during normal operation, system transients, or during maintenance. When an electric arc occurs within the enclosure, it results in a pronounced increase in the pressure and temperature of gas within the enclosure. This sudden increase in gas pressure and temperature poses a risk of hot gas escaping the enclosure in an uncontrolled manner, which in turn poses a risk of harm to people or equipment in the vicinity. It is therefore desirable to minimize such risk, and in a manner that maintains protection of the indoor power equipment from outdoor environmental condition such as rain and snow.

SUMMARY

Described herein is an outdoor enclosure for housing power distribution equipment including an improved means for evacuating arc flash gases from inside the enclosure to the atmosphere, comprising an expansion chamber and improved chimney.

In particular, in one embodiment, the outdoor enclosure is described comprising an enclosure body comprising a base, at least four wall structures, and a roof structure, wherein each of the at least four wall structures is attached at one end to the base and at an opposite end to the roof structure so as to provide an enclosure interior space, and wherein the roof structure overhangs at least one of the at least four wall structures so as to provide a ventilation channel that does not permit entry of rain or snow into the enclosure interior space. Moreover, a first wall structure of the at least four wall structures is provided, wherein the first wall structure has an interior surface facing the enclosure interior space and an exterior surface opposite thereto. A first opening in the first wall structure exists, wherein the first opening is located more proximate the roof structure than the base, and wherein the first opening provides an evacuation vent for arc flash gases from the enclosure interior space. Power distribution equipment disposed in the enclosure interior space. In one embodiment, the power distribution equipment is indoor medium voltage circuit breaker(s). In another embodiment, it is medium voltage switch(es). An expansion chamber structure is provided having a top panel, wherein the expansion chamber structure abuts the exterior surface of the first wall structure and is attached to the first wall structure so as to surround and seal the perimeter of the first opening, and wherein the expansion chamber structure and the first wall structure together define an expansion chamber for receiving arc flash gases from the enclosure interior space through the first opening, and wherein the top panel has an interior surface facing the expansion chamber and an exterior surface opposite thereto, and wherein the top panel has a second opening that provides an evacuation vent for arc flash gases from the expansion chamber. In one embodiment, the expansion chamber structure also comprises two side panels, a bottom panel, and a back panel, wherein the bottom panel forms an angle with the first wall structure sufficient to deflect arc fault gases toward the chimney. In one embodiment, the angle is approximately 45°. A chimney is provided comprising a chimney base and a capping structure, wherein the chimney base has a first side proximate the first wall structure and a second side distal thereto, and the capping structure has a first side proximate the first wall structure and a second side distal thereto, wherein the chimney base has a bottom end that is open and abuts the exterior surface of the top panel and is attached to the top panel so as to surround and seal the perimeter of the second opening, and wherein the chimney base has a top end that is open and opposite the bottom end, wherein the capping structure has a top end that is closed and a bottom end opposite thereto that is open and abuts the top end of the chimney base and is attached to the top end of the chimney base so as to surround and seal the perimeter, with the exception that the first side of the capping structure is more proximate the first wall structure than the first side of the chimney base, and laterally spaced apart therefrom by a first distance so as to provide a first chimney vent, and wherein the chimney base and the capping structure together enclose and define a chimney flue space for receiving arc flash gases from the expansion chamber, and wherein the first chimney vent provides a weather-resistant outlet for arc flash gases from the chimney flue space. In one embodiment, the first distance is 3.7 centimeters.

In another embodiment, described herein, the outdoor enclosure further comprises a second wall structure of the at least four wall structures having an interior surface facing the enclosure interior space and an exterior surface opposite thereto, and having a third opening, wherein the third opening is located more proximate the roof structure than the base, and wherein the third opening provides another evacuation vent for arc flash gases from the enclosure interior space. Moreover, it further comprises a second expansion chamber structure having a top panel, wherein the second expansion chamber structure abuts the exterior surface of the second wall structure and is attached to the second wall structure so as to surround and seal the perimeter of the third opening, and wherein the second expansion chamber structure and the second wall structure together define a second expansion chamber for receiving arc flash gases from the enclosure interior space through the third opening, and wherein the top panel has an interior surface facing the second expansion chamber and an exterior surface opposite thereto, and wherein the top panel has a fourth opening that provides an evacuation vent for arc flash gases from the second expansion chamber. A second chimney is provided comprising a second chimney base and a second capping structure, wherein the second chimney base has a first side proximate the second wall structure and a second side distal thereto, and the second capping structure has a first side proximate the second wall structure and a second side distal thereto. The second chimney base has a bottom end that is open and abuts the exterior surface of the top panel of the second expansion chamber structure and is attached to the top panel so as to surround and seal the perimeter of the fourth opening, and the second chimney base has a top end that is open and opposite the bottom end.

The second capping structure has a top end that is closed and a bottom end opposite thereto that is open and abuts the top end of the second chimney base and is attached to the top end of the second chimney base so as to surround and seal the perimeter, except that the first side of the second capping structure is more proximate the second wall structure than the first side of the second chimney base, and laterally spaced apart therefrom by a third distance so as to provide a third chimney vent, wherein the second chimney base and the second capping structure together enclose and define a second chimney flue space for receiving arc flash gases from the second expansion chamber, and wherein the first and third chimney vents provide weather-resistant outlets for arc flash gases from the first and second chimney flue spaces, respectively. In one embodiment, the first and third distances are each 3.7 centimeters.

In yet another embodiment, a second chimney vent is provided in the first chimney and a fourth chimney vent is provided in the second chimney, insofar as the second side of the first capping structure is less proximate the first wall structure than the second side of the first chimney base, and laterally spaced apart therefrom by a second distance, so as to provide a second chimney vent, and the second side of the second capping structure is less proximate the second wall structure than the second side of the second chimney base, and laterally spaced apart therefrom by a fourth distance, so as to provide a fourth chimney vent. In one embodiment, the first and third distances are each 2.9 centimeters, whereas the second and fourth distances are each 1.0 centimeters.

BRIEF DESCRIPTION OF THE DRAWINGS

In the accompanying drawings, structural embodiments are illustrated that, together with the detailed description provided below, describe exemplary embodiments of an improved outdoor enclosure for power distribution equipment. One of ordinary skill in the art will appreciate that a component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

FIG. 1A is a perspective view of an exemplary outdoor enclosure in accordance with one embodiment disclosed herein;

FIG. 1B is a perspective view of the outdoor enclosure illustrated in FIG. 1A, looking back along the same line of view as in FIG. 1A, and showing the opposite portion thereof;

DETAILED DESCRIPTION

The outdoor enclosures and principles disclosed in this application are applicable to power distribution equipment of various size, types, and rating. Non-limiting examples of suitable power distribution equipment for use herein include indoor medium voltage circuit breakers and indoor switches. Non-limiting examples of suitable commercially available power distribution equipment include, but are not limited to, indoor vacuum and gas insulated circuit breakers such as the ADVAC™, AMVAC™, VD4™, eVD4™, VM1™, VMax™, and HD4™ series circuit breakers, offered by ABB, and indoor air and gas insulated medium voltage switches such as the NAL™, VersaRupter™, and G-Sec™ series of switches, also offered by ABB.

Figure 1C:
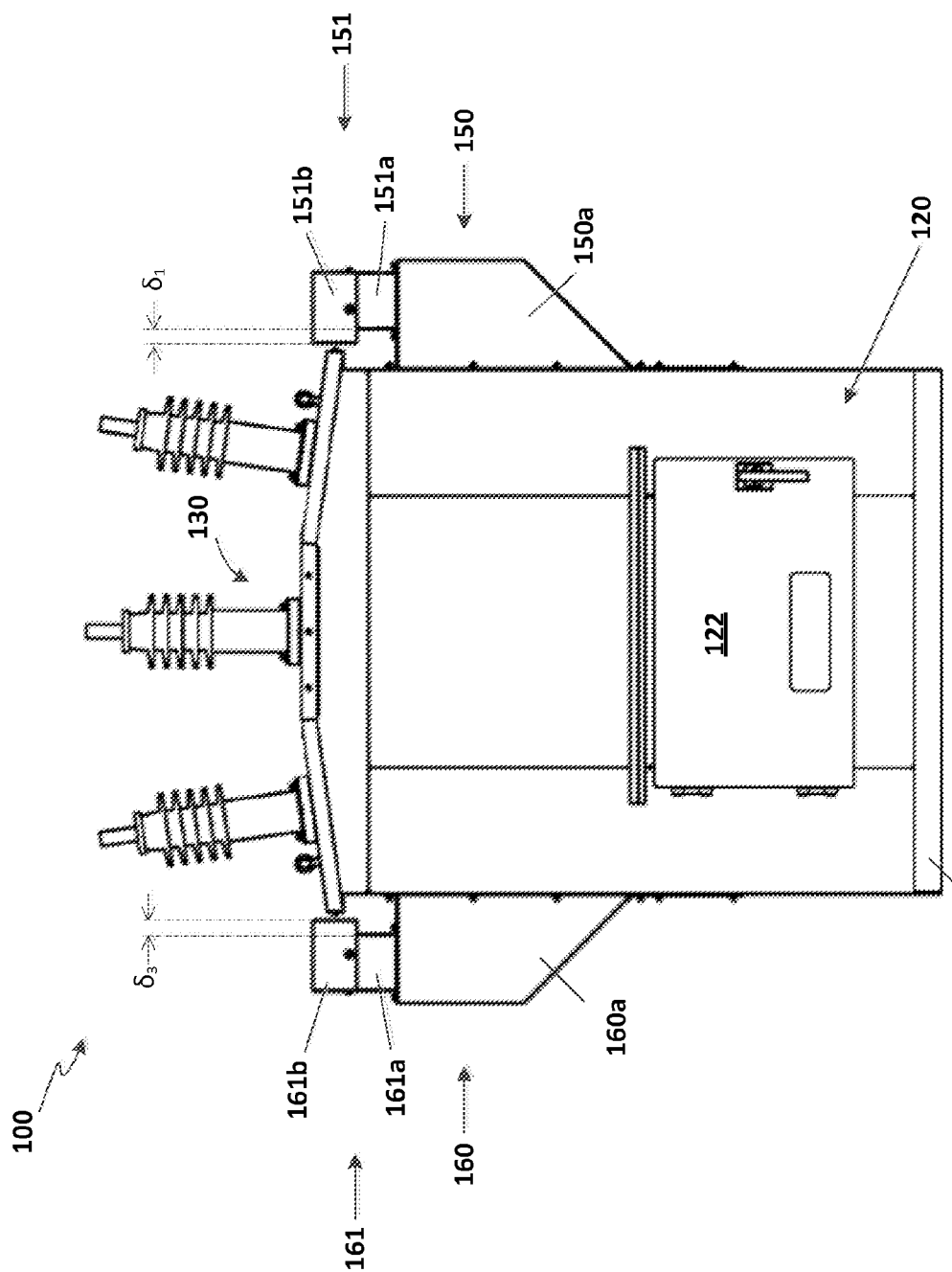
FIG. 1C is a perspective view of the outdoor enclosure illustrated in FIG. 1A, looking at the enclosure from a center/front position.
Figure 2:
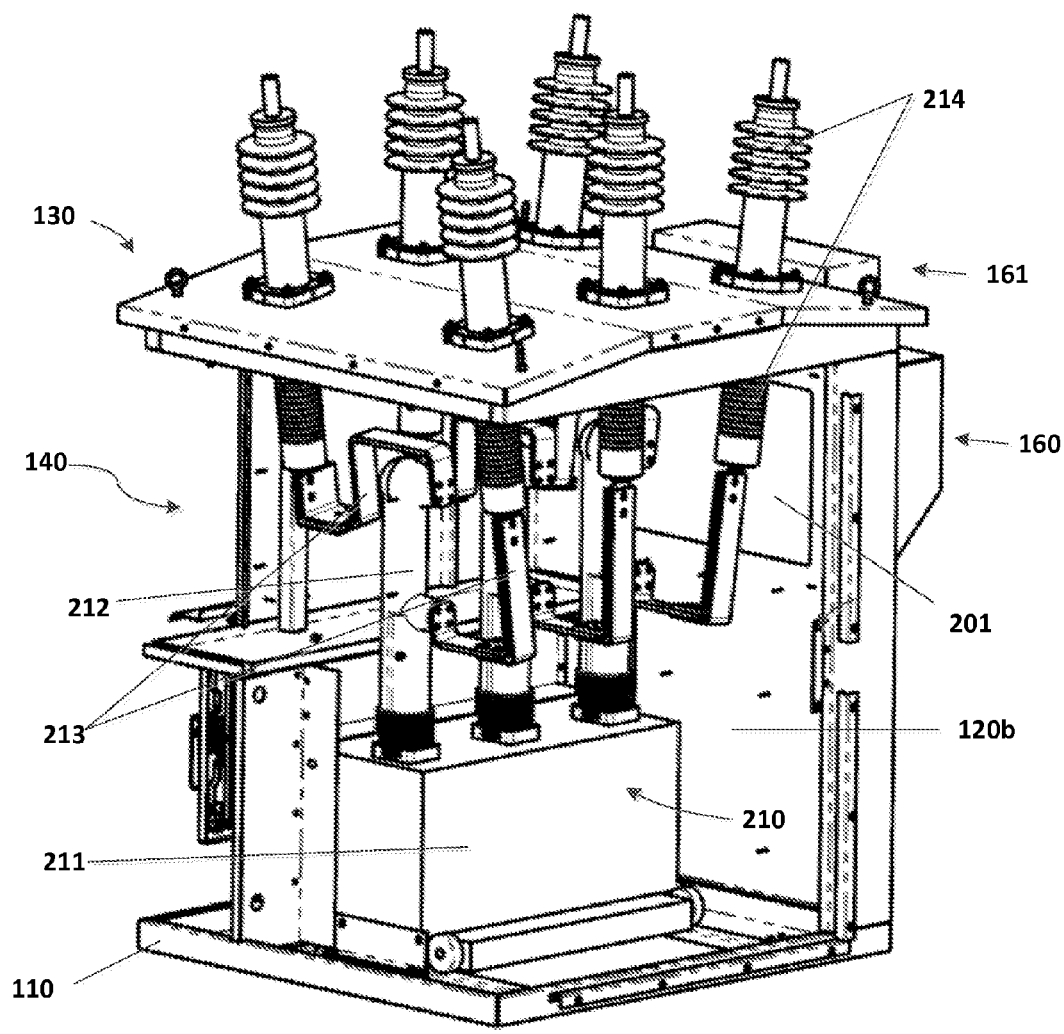
FIG. 2 is a perspective partial view of the outdoor enclosure illustrated in FIG. 1B, omitting three wall structures and showing the interior of the enclosure.

Referring to FIGS. 1 & 2, an outdoor enclosure 100 according to one embodiment of the present invention is shown. Enclosure 100 comprises an enclosure body having a base 110, at least four wall structures 120, and a roof structure 130. The wall structures 120 are each attached at their bottom end portion to the base 110. Wall structures 120 may be fashioned in any suitable manner or in any suitable form sufficient to protect the interior of the enclosure from weather conditions and to withstand arc faults emanating from inside the enclosure. In an embodiment, one or more metallic panels 121 are attached together. Note that the use of the term "attached" throughout this disclosure may mean directly or indirectly bolted, crimped, welded, fastened, stamped from one piece, bonded, etc. Wall structure 120 may include one or more access doors 122. In another embodiment, a wall structure 120 may comprise a single metallic sheet. In another embodiment, a wall structure 120 may comprise a plurality of metallic panels attached to one or more frame structures (not shown).

With continued reference to FIGS. 1 & 2, wall structures 120 are each attached at their top end portions (the end portion opposite the bottom end portion) to roof structure 130 so as to provide an interior space 140. Roof structure 130 may be fashioned in any suitable manner or in any suitable form sufficient to provide a roof that protects the interior of the enclosure from weather conditions and withstands arc faults emanating from inside the enclosure. In an embodiment, roof structure 130 comprises a metal panel 131 arranged to provide a roof having a flat apex panel and two sloping end portions, wherein the metal panel 131 is attached to one or more metallic shroud panels 132 that are themselves attached to the top end portions of wall structures 120. Roof structure 130 overhangs at least one of the at least four wall structures so as to provide a ventilation channel 300 (see FIG. 3B) that does not permit entry of rain or snow into the enclosure interior space 140.

A first wall structure 120a, of the at least four wall structures, has an interior surface (see FIG. 3A) facing the enclosure interior space and an exterior surface opposite thereto. Likewise, a second wall structure 120b has an interior surface (see FIG. 2) and an exterior surface. First wall structure 120a has a first opening 200 (FIG. 3A) that is more proximate the roof structure 130 than the base 110. For example, the centroid of the opening is located closer to the roof structure 130 than the base 110. In one embodiment, second wall structure 120b has a third opening 201 (see FIG. 2) that is more proximate the roof structure 130 than the base 110. First and third openings each provide evacuation vents for arc flash gases from the enclosure interior space 140. In one embodiment, a flap (not shown) covers first and third openings 200, 201.

Referring to FIG. 2, power distribution equipment is disposed in the interior space 140. In one embodiment, power distribution equipment is a medium voltage circuit breaker 210. Medium voltage circuit breakers are known in the art, and may comprise a removable truck 211, column-type embedded breaker poles 212, bus bars 213, and terminal bushings 214. In another embodiment, power distribution equipment is a medium voltage indoor switch (not shown).

With continued reference to FIGS. 1 & 2, the outdoor enclosure includes at least one improved means for evacuating arc flash gases from inside the enclosure to the atmosphere, comprising an expansion chamber and chimney combination as described herein. In one embodiment, outdoor enclosure 100 has two such evacuation means comprising first and second expansion chambers 150, 160 and first and second chimneys 151, 161, respectively. Detailed description of one such evacuation means—first expansion chamber 150 and first chimney 151—is provided herein with reference to FIG. 3, but that description supports and describes any additional evacuation means that a particular embodiment may employ, such as for example second expansion chamber 160 and second chimney 161.

Figure 3A:
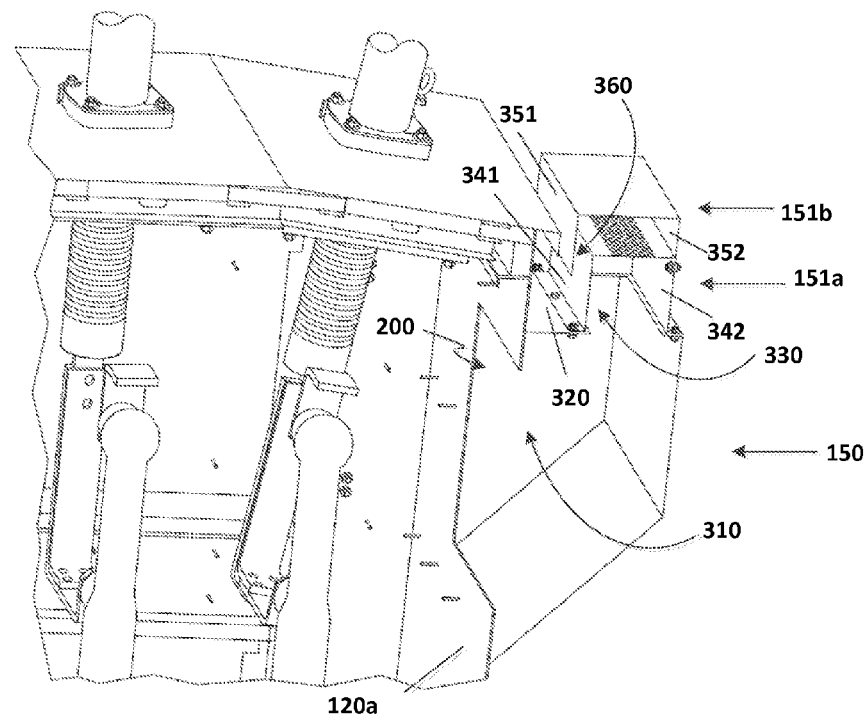
FIG. 3A is a sectional view of a portion of the outdoor enclosure illustrated in FIG. 1B along the line A-A', showing a portion of an expansion chamber structure and chimney according to one embodiment disclosed herein.
Figure 3B:
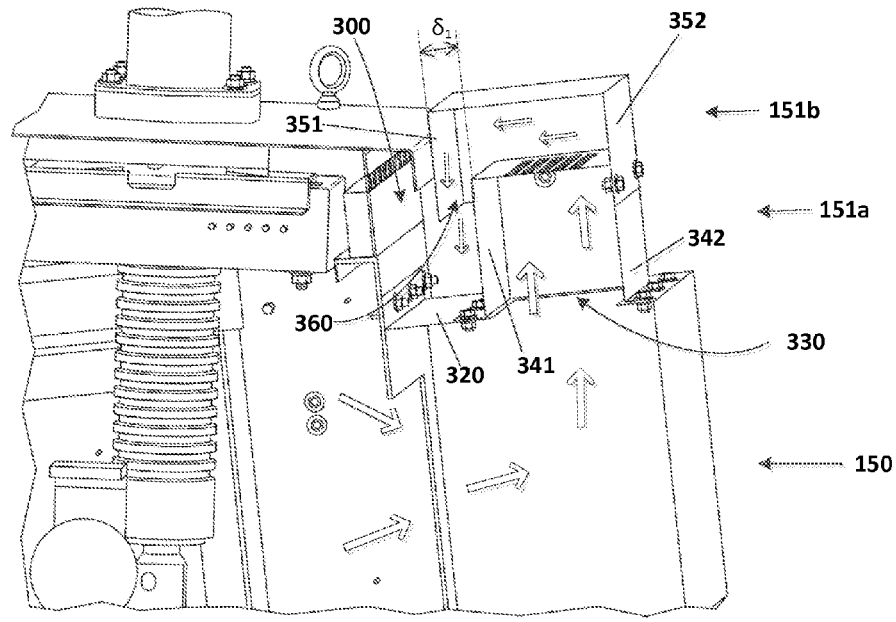
FIG. 3B is a sectional view of a portion of the outdoor enclosure illustrated in FIG. 1B along the line A-A', showing a portion of an expansion chamber structure and chimney according to one embodiment disclosed herein.

In particular, FIGS. 3A & 3B are sectional views of a portion of outdoor enclosure 100 along line A-A' in FIG. 1B, showing a detailed view of first expansion chamber structure 150 and first chimney 151. Expansion chamber structure 150 abuts the exterior surface of the first wall structure 120a and is attached to the first wall structure 120a so as to surround and seal the perimeter of the first opening 200. The term "seal," as used throughout this disclosure, simply implies that the attached components are sufficiently sealed to prevent catastrophic arc gas ventilation to atmosphere through the sealed portion; it is not required that the seal prohibit all fluid passage. For example, in one embodiment, a drainage piece 170 (FIG. 1) is attached to the exterior surface of the wall structure 120a,b and extends into the expansion chamber structure 150, 160, from a point outside the expansion chamber structure, so as to provide a drainage channel for any water that may have entered the expansion chamber through the seals.

With continued reference to FIGS. 3A & 3B, expansion chamber structure 150 and first wall structure 120a together define an expansion chamber 310. Expansion chamber 310 functions to receive arc flash gases from the enclosure interior space 140 through the first opening 200, as depicted by the arrows in FIG. 3B, and to direct the gases toward the chimney. Expansion chamber structure 150 may be designed in any manner or any shape sufficient to provide a suitable expansion chamber and to direct arc flash gases toward the chimney structure. In one embodiment, expansion chamber structure 150 has a top panel 320 that extends perpendicularly outward from the first wall structure 120a. Top panel 320 has an interior surface (not shown) facing expansion chamber 310 and an exterior surface (shown in FIGS. 3A & 3B) opposite thereto. Top panel 320 has a second opening 330 that provides an evacuation vent for arc flash gases from expansion chamber 310, as illustrated by arrows in FIG. 3B. It should be noted that "open" or "opening," as used throughout this disclosure, may include a single, un-obstructed opening, aperture, gap, slat, throughhole, etc., as well as those having partial obstructions (e.g., screens, meshes, etc); additionally, the term may include the use of multiple, smaller opening, apertures, gaps, throughholes, slats, etc.

In another embodiment, expansion chamber structure 150 comprises top panel 320, a first side panel 150a (FIG. 1A) and a second side panel 150b (FIG. 1B), a bottom panel 150c (FIG. 1) and a back panel 150d (FIG. 1). Further, top panel 320, side panels 150a,b and bottom panel 150c each abut the exterior surface of first wall structure 120a and are attached to first wall structure 120a so as to surround and seal the perimeter of first opening 200. Bottom panel 150c forms an angle with the first wall structure so as to sufficiently deflect arc fault gases toward the chimney. In one embodiment, bottom panel 150c forms an angle with first wall structure 120a of approximately 45°.

With continued reference to FIGS. 3A & 3B, chimney 151 comprises chimney base 151a and capping structure 151b. Chimney base 151a has a first side 341 proximate first wall structure 120a and a second side 342 distal thereto. Capping structure 151b has a first side 351 proximate first wall structure 120a and a second side 352 distal thereto. Chimney base 151a has a bottom end that is open and abuts the exterior surface of top panel 320 and is attached to the top panel so as to surround and seal the perimeter of second opening 330. Chimney base 151a has a top end that is open and opposite the bottom end. Capping structure 151b has a top end that is closed and a bottom end opposite thereto that is open and abuts the top end of chimney base 151a. Capping structure 151b is attached to the top end of chimney base 151a so as to surround and seal the perimeter thereof; except that first side 351 of capping structure 151b is more proximate first wall structure 120a than first side 341 of chimney base 151a. Further, first side 351 is laterally spaced apart from first side 341 by a first distance $\delta_1$ so as to provide a first chimney vent 360. First distance $\delta_1$ may be any characteristic distance sufficient to provide arc fault resistance. For example, first distance $\delta_1$ may be chosen such that the enclosure passes the IEEE C37.20.7 standard arc fault testing requirements. In one embodiment, first distance $\delta_1$ is 3.7 centimeters.

With continued reference to FIGS. 3A & 3B, chimney base 151a and capping structure 151b together enclose and define a chimney flue space for receiving arc flash gases from expansion chamber 310, as illustrated by the arrows in FIG. 3B. As may be readily appreciated by the aforementioned design, first chimney vent 360 provides a weather-resistant outlet for arc flash gases from the chimney flue space, and allows for the safe ventilation of arc flash gases toward the enclosure body so as to safely dissipate the energy of the gases.

With reference to FIGS. 1 & 2, in one embodiment the outdoor enclosure 100 includes second expansion chamber structure 160 having a top panel and a second chimney comprising a second chimney base 161a and a second capping structure 161b. The second expansion chamber structure 160 abuts the exterior surface of the second wall structure 120b and is attached to the second wall structure 120b so as to surround and seal the perimeter of the third opening 201. The second expansion chamber structure 160 and the second wall structure 120b together define a second expansion chamber (not shown) for receiving arc flash gases from the enclosure interior space 140 through third opening 201. The top panel has an interior surface (not shown) facing the second expansion chamber and an exterior surface opposite thereto, wherein the top panel has a fourth opening (not shown) that provides an evacuation vent for arc flash gases from the second expansion chamber. The second chimney base 161a has a first side (not shown) proximate the second wall structure 120b and a second side (not shown) distal thereto, and the second capping structure 161b has a first side (not shown) proximate the second wall structure and a second side (not shown) distal thereto. The second chimney base 161a has a bottom end that is open and abuts the exterior surface of the top panel of the second expansion chamber structure 160 and is attached to the top panel so as to surround and seal the perimeter of the fourth opening (not shown), and wherein the second chimney base 161a has a top end that is open and opposite the bottom end. The second capping structure 161b has a top end that is closed and a bottom end opposite thereto that is open and abuts the top end of the second chimney base and is attached to the top end of the second chimney base so as to surround and seal the perimeter, except that the first side of the second capping structure 161b is more proximate the second wall structure 120b than the first side of the second chimney base 161a, and laterally spaced apart therefrom by a third distance $\delta_3$ so as to provide a third chimney vent (not shown). Third distance $\delta_3$ may be any characteristic distance sufficient to provide arc fault resistance. For example, third distance $\delta_3$ may be chosen such that the enclosure passes the IEEE C37.20.7 standard arc fault testing requirements. In one embodiment, third distance $\delta_3$ is 3.7 centimeters. Second chimney base 161a and the second capping structure 161b together enclose and define a second chimney flue space for receiving arc flash gases from the second expansion chamber. The first and third chimney vents provides weather-resistant outlets for arc flash gases from the first and second chimney flue spaces, respectively.

With continued reference to FIGS. 1&2, another embodiment is described. The first and second expansion chamber structures 150, 160 further each comprise a first side panel 150a, 160a, a second side panel 150b, 160b (not shown), a bottom panel 150c, 160c (not shown), and a back panel 150d, 160d (not shown). The top, bottom, and two side panels of each expansion chamber structures each abut the exterior surface of the first and second wall structures 120a, 120b, respectively, and are attached to the first and second wall structures 120a, 120b so as to surround and seal the perimeter of the first and third openings 200, 201 (see FIG. 3), respectively, and wherein the bottom panel 150c of the first expansion chamber structure 150 forms an angle with the first wall structure 120a so as to sufficiently deflect arc fault gases toward the chimney. In one embodiment, bottom panel 150c forms an angle with first wall structure 120a of approximately 45°. In one embodiment, both first distance $\delta_1$ and third distance $\delta_3$ are each 3.7.

Figure 4:
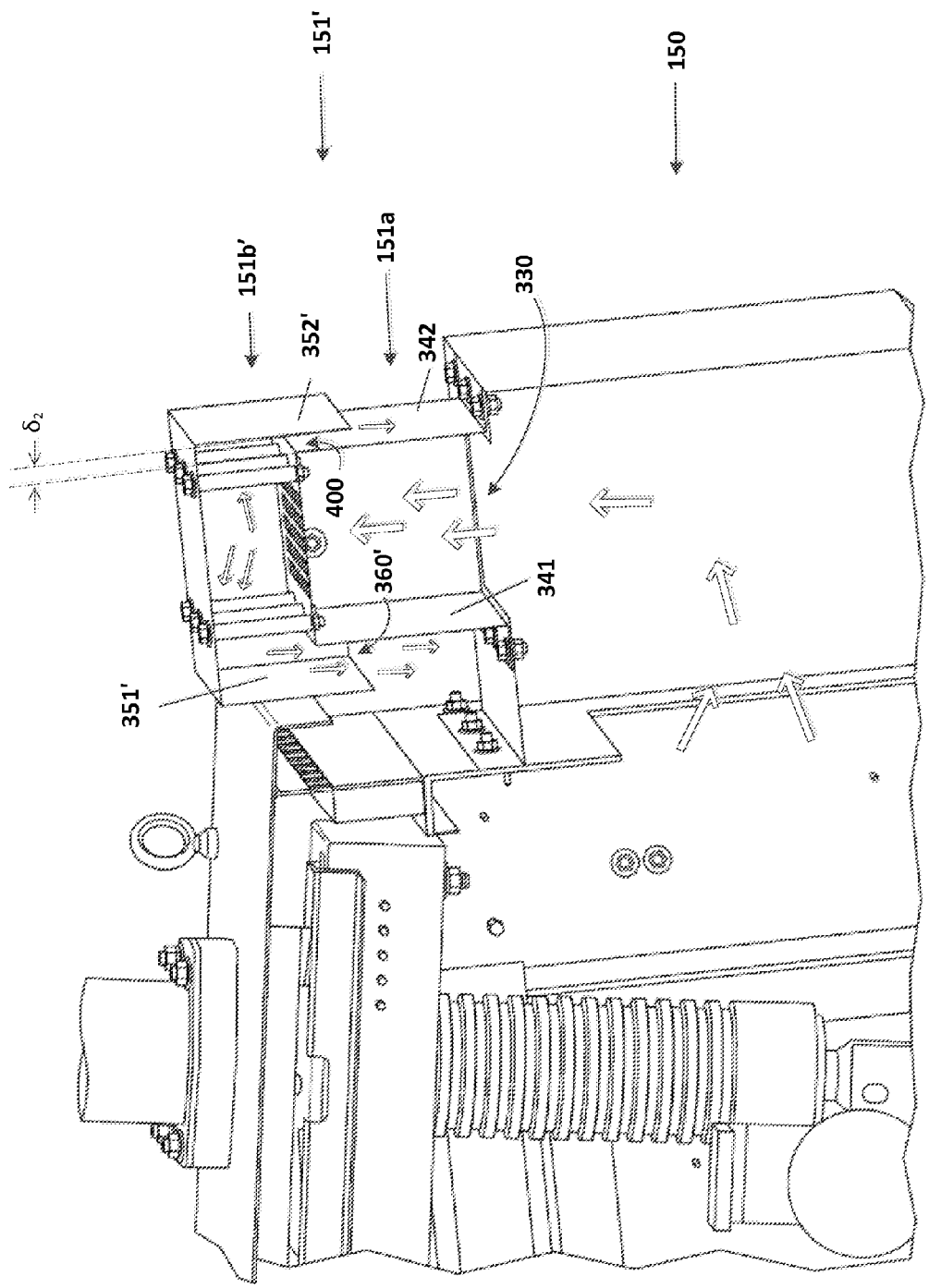
FIG. 4 is a sectional view of a portion of the outdoor enclosure illustrated in FIG. 1B along the line A-A', showing a portion of an expansion chamber structure another and chimney according to another embodiment disclosed herein.

With reference to FIG. 4, another embodiment is described, having a modified chimney. FIG. 4 shows a sectional view of a portion of outdoor enclosure 100 along line A-A' in FIG. 1B, showing a detailed view of first expansion chamber structure 150 and first chimney 151'. Chimney 151' comprises chimney base 151a (described above) and capping structure 151b'. Capping structure 151b' has a first side 351' proximate first wall structure 120a and a second side 352' distal thereto. Capping structure 151b' has a top end that is closed and a bottom end opposite thereto that is open and abuts the top end of chimney base 151a. Capping structure 151b' is attached to the top end of chimney base 151a so as to surround and seal the perimeter thereof, except that first side 351' of capping structure 151b' is more proximate first wall structure 120a than first side 341 of chimney base 151a, and except that second side 352' of capping structure 151b' is less proximate first wall structure 120a than second side 342 of chimney base 151a. Further, first side 351 of capping structure 151b' is laterally spaced apart from first side 341 of chimney base 151a by a first distance $\delta_1$' so as to provide a first chimney vent 360', and second side 352' of capping structure 151b' is laterally spaced apart from second side 342 of chimney base 151a by a second distance $\delta_2$ so as to provide a second chimney vent 400. First distance $\delta_1$' and second distance $\delta_2$ may be any characteristic distances sufficient to provide arc fault resistance. For example, first distance $\delta_1$' and second distance $\delta_2$ may be chosen such that the enclosure passes the IEEE C37.20.7 standard arc fault testing requirements. In one embodiment, first distance $\delta_1$' is 2.9 centimeters and second distance $\delta_2$ is 1.0 centimeters.

With continued reference to FIG. 4, chimney base 151a and capping structure 151b' together enclose and define a chimney flue space for receiving arc flash gases from expansion chamber 310, as illustrated by the arrows. As may be readily appreciated by the aforementioned design, first chimney vent 360 and second chimney vent 400 together provide a weather-resistant outlet for arc flash gases from the chimney flue space, and allows for the safe ventilation of arc flash gases that are primarily directed toward the enclosure body so as to safely dissipate the energy of the gases.

In yet another embodiment, the outdoor enclosure 100 includes second expansion chamber structure 160 having a top panel and a second chimney comprising a second chimney base 161a and a second capping structure (not shown). The second chimney base 161a has a first side (not shown) proximate the second wall structure 120b and a second side (not shown) distal thereto, and the second capping structure has a first side (not shown) proximate the second wall structure and a second side (not shown) distal thereto. The second chimney base 161a has a bottom end that is open and abuts the exterior surface of the top panel of the second expansion chamber structure 160 and is attached to the top panel so as to surround and seal the perimeter of the fourth opening (not shown), and wherein the second chimney base 161a has a top end that is open and opposite the bottom end. The second capping structure has a top end that is closed and a bottom end opposite thereto that is open and abuts the top end of the second chimney base and is attached to the top end of the second chimney base so as to surround and seal the perimeter, except that the first side of the second capping structure is more proximate the second wall structure 120b than the first side of the second chimney base 161a, and except that second side of second capping structure is less proximate second wall structure 120b than second side of second chimney base 161a. Further, first side of the second capping structure is laterally spaced apart from first side of second chimney base 161a by a third distance $\delta_3$' so as to provide a third chimney vent (not shown), and second side of second capping structure is laterally spaced apart from second side of second chimney base 161a by a fourth distance $\delta_4$ (not shown) so as to provide a fourth chimney vent (not shown). First distance $\delta_1$', second distance $\delta_2$, third distance $\delta_3$', and fourth distance $\delta_4$ may be any characteristic distances sufficient to provide arc fault resistance. For example, they may be chosen such that the enclosure passes the IEEE C37.20.7 standard arc fault testing requirements. In one embodiment, first distance $\delta_1$' and third distance $\delta_3$ are 2.9 centimeters, and second distance $\delta_2$ and fourth distance $\delta_4$ are 1.0 centimeters.

To the extent that the term "includes" or "including" is used in the specification or the claims, it is intended to be inclusive in a manner similar to the term "comprising" as that term is interpreted when employed as a transitional word in a claim. Furthermore, to the extent that the term "or"

is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

We claim:

1. An outdoor enclosure for housing power distribution equipment comprising:
    an enclosure body comprising a base, at least four wall structures, and a roof structure, wherein each of the at least four wall structures is attached at one end to the base and at an opposite end to the roof structure so as to provide an enclosure interior space, and wherein the roof structure overhangs at least one of the at least four wall structures so as to provide a ventilation channel that does not permit entry of rain or snow into the enclosure interior space;
    a first wall structure of the at least four wall structures, wherein the first wall structure has an interior surface facing the enclosure interior space and an exterior surface opposite thereto;
    a first opening in the first wall structure, wherein the first opening is located more proximate the roof structure than the base, and wherein the first opening provides an evacuation vent for arc flash gases from the enclosure interior space;
    power distribution equipment disposed in the enclosure interior space;
    an expansion chamber structure having a top panel, wherein the expansion chamber structure abuts the exterior surface of the first wall structure and is attached to the first wall structure so as to surround and seal the perimeter of the first opening, and wherein the expansion chamber structure and the first wall structure together define an expansion chamber for receiving arc flash gases from the enclosure interior space through the first opening, and wherein the top panel has an interior surface facing the expansion chamber and an exterior surface opposite thereto, and wherein the top panel has a second opening that provides an evacuation vent for arc flash gases from the expansion chamber; and
    a chimney comprising a chimney base and a capping structure,
    wherein the chimney base has a first side proximate the first wall structure and a second side distal thereto, and the capping structure has a first side proximate the first wall structure and a second side distal thereto,
    wherein the chimney base has a bottom end that is open and abuts the exterior surface of the top panel and is attached to the top panel so as to surround and seal the perimeter of the second opening, and wherein the chimney base has a top end that is open and opposite the bottom end,
    wherein the capping structure has a top end that is closed and a bottom end opposite thereto that is open and abuts the top end of the chimney base and is attached to the top end of the chimney base so as to surround and seal the perimeter, with the exception that the first side of the capping structure is more proximate the first wall structure than the first side of the chimney base, and laterally spaced apart therefrom by a first distance so as to provide a first chimney vent, and wherein the chimney base and the capping structure together enclose and define a chimney flue space for receiving arc flash gases from the expansion chamber, and
    wherein the first chimney vent provides a weather-resistant outlet for arc flash gases from the chimney flue space.

2. The outdoor enclosure of claim 1 wherein the expansion chamber structure further comprises two side panels, a bottom panel, and a back panel, and wherein the top, bottom and two side panels each abut the exterior surface of the first wall structure and are attached to the first wall structure so as to surround and seal the perimeter of the first opening, and wherein the bottom panel forms an angle with the first wall structure of 45 degrees.

3. The outdoor enclosure of claim 1 wherein the power distribution equipment is an indoor medium voltage circuit breaker.

4. The outdoor enclosure of claim 1 wherein the power distribution equipment is an indoor medium voltage switch.

5. The outdoor enclosure of claim 1 wherein the first distance is 3.7 centimeters.

6. The outdoor enclosure of claim 1 wherein the bottom end of the capping structure is attached to the top end of the chimney base so as to surround and seal the perimeter, with the exception that the first side of the capping structure is more proximate the first wall structure than the first side of the chimney base, and laterally spaced apart therefrom by a first distance, so as to provide a first chimney vent, and with the exception that the second side of the capping structure is less proximate the first wall structure than the second side of the chimney base, and laterally spaced apart therefrom by a second distance, so as to provide a second chimney vent, and wherein the first distance is 2.9 centimeters, and the second distance is 1.0 centimeters.

7. An outdoor enclosure for housing power distribution equipment comprising:
    an enclosure body comprising a base, at least four wall structures, and a roof structure, wherein each of the at least four wall structures is attached at one end to the base and at an opposite end to the roof structure so as to provide an enclosure interior space, and wherein the roof structure overhangs at least one of the at least four wall structures so as to provide a ventilation channel that does not permit entry of rain or snow into the enclosure interior space;
    first and second wall structures of the at least four wall structures, wherein the first and second wall structures each have an interior surface facing the enclosure interior space and an exterior surface opposite thereto;
    a first opening in the first wall structure and a third opening in the second wall structure, wherein the first and third openings are each located more proximate the roof structure than the base, and wherein the first and third openings provide evacuation vents for arc flash gases from the enclosure interior space;

power distribution equipment disposed in the enclosure interior space;

a first expansion chamber structure having a top panel, wherein the first expansion chamber structure abuts the exterior surface of the first wall structure and is attached to the first wall structure so as to surround and seal the perimeter of the first opening, and wherein the first expansion chamber structure and the first wall structure together define a first expansion chamber for receiving arc flash gases from the enclosure interior space through the first opening, and wherein the top panel has an interior surface facing the first expansion chamber and an exterior surface opposite thereto, and wherein the top panel has a second opening that provides an evacuation vent for arc flash gases from the first expansion chamber;

a second expansion chamber structure having a top panel, wherein the second expansion chamber structure abuts the exterior surface of the second wall structure and is attached to the second wall structure so as to surround and seal the perimeter of the third opening, and wherein the second expansion chamber structure and the second wall structure together define a second expansion chamber for receiving arc flash gases from the enclosure interior space through the third opening, and wherein the top panel has an interior surface facing the second expansion chamber and an exterior surface opposite thereto, and wherein the top panel has a fourth opening that provides an evacuation vent for arc flash gases from the second expansion chamber;

a first chimney comprising a first chimney base and a first capping structure, wherein the first chimney base has a first side proximate the first wall structure and a second side distal thereto, and the first capping structure has a first side proximate the first wall structure and a second side distal thereto, wherein the first chimney base has a bottom end that is open and abuts the exterior surface of the top panel of the first expansion chamber structure and is attached to the top panel so as to surround and seal the perimeter of the second opening, and wherein the first chimney base has a top end that is open and opposite the bottom end, wherein the first capping structure has a top end that is closed and a bottom end opposite thereto that is open and abuts the top end of the first chimney base and is attached to the top end of the first chimney base so as to surround and seal the perimeter, with the exception that the first side of the first capping structure is more proximate the first wall structure than the first side of the first chimney base, and laterally spaced apart therefrom by a first distance so as to provide a first chimney vent, and wherein the first chimney base and the first capping structure together enclose and define a first chimney flue space for receiving arc flash gases from the first expansion chamber, a second chimney comprising a second chimney base and a second capping structure, wherein the second chimney base has a first side proximate the second wall structure and a second side distal thereto, and the second capping structure has a first side proximate the second wall structure and a second side distal thereto, wherein the second chimney base has a bottom end that is open and abuts the exterior surface of the top panel of the second expansion chamber structure and is attached to the top panel so as to surround and seal the perimeter of the fourth opening, and wherein the second chimney base has a top end that is open and opposite the bottom end, wherein the second capping structure has a top end that is closed and a bottom end opposite thereto that is open and abuts the top end of the second chimney base and is attached to the top end of the second chimney base so as to surround and seal the perimeter, except that the first side of the second capping structure is more proximate the second wall structure than the first side of the second chimney base, and laterally spaced apart therefrom by a third distance so as to provide a third chimney vent, and wherein the second chimney base and the second capping structure together enclose and define a second chimney flue space for receiving arc flash gases from the second expansion chamber, and wherein the first and third chimney vents provides weather-resistant outlets for arc flash gases from the first and second chimney flue spaces, respectively.

8. The outdoor enclosure of claim 7 wherein the first and second expansion chamber structures further each comprise two side panels, a bottom panel, and a back panel, and wherein the top, bottom and two side panels each abut the exterior surface of the first and second wall structures, respectively, and are attached to the first and second wall structures so as to surround and seal the perimeter of the first and third openings, respectively, and wherein the bottom panel of the first expansion chamber structure forms an angle with the first wall structure of 45 degrees, and the bottom panel of the second expansion chamber structure forms an angle with the second wall structure of 45 degrees.

9. The outdoor enclosure of claim 7 wherein the power distribution equipment is an indoor medium voltage circuit breaker.

10. The outdoor enclosure of claim 7 wherein the power distribution equipment is an indoor medium voltage switch.

11. The outdoor enclosure of claim 7 wherein the first and third distances are each 3.7 centimeters.

12. The outdoor enclosure of claim 7 wherein the bottom end of each capping structure is attached to the top end of each chimney base so as to surround and seal the perimeter, with the exception that the first side of the first capping structure is more proximate the first wall structure than the first side of the first chimney base, and laterally spaced apart therefrom by a first distance, so as to provide a first chimney vent, and with the exception that the second side of the first capping structure is less proximate the first wall structure than the second side of the first chimney base, and laterally spaced apart therefrom by a second distance, so as to provide a second chimney vent, and wherein the first side of the second capping structure is more proximate the second wall structure than the first side of the second chimney base, and laterally spaced apart therefrom by a third distance, so as to provide a third chimney vent, and with the exception that the second side of the second capping structure is less proximate the second wall structure than the second side of the second chimney base, and laterally spaced apart therefrom by a fourth distance, so as to provide a fourth chimney vent, and wherein the second and fourth distances are each 1.0 centimeters and the first and third distances are each 2.9 centimeters.

* * * * *